US012669587B2

(12) United States Patent
Oelslager et al.

(10) Patent No.: US 12,669,587 B2
(45) Date of Patent: Jun. 30, 2026

(54) OPTICAL TRACKING CONTROL SYSTEM

(71) Applicant: The Government of the United States of America, as represented by the Secretary of the Navy, Arlington, VA (US)

(72) Inventors: Peter J. Oelslager, Stafford, VA (US); Matthew J. Moody, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 702 days.

(21) Appl. No.: 18/131,068

(22) Filed: Apr. 5, 2023

(65) Prior Publication Data

US 2024/0134012 A1    Apr. 25, 2024
US 2024/0230849 A9    Jul. 11, 2024

Related U.S. Application Data

(60) Provisional application No. 63/362,535, filed on Apr. 6, 2022.

(51) Int. Cl.
*H04B 10/118*      (2013.01)
*G01S 7/481*      (2006.01)
(Continued)

(52) U.S. Cl.
CPC ............ *G01S 7/4816* (2013.01); *G01S 7/493* (2013.01); *G01S 7/4972* (2013.01); *G01S 17/66* (2013.01);
(Continued)

(58) Field of Classification Search
CPC .............................................. H04B 10/11–118
See application file for complete search history.

(56) References Cited

U.S. PATENT DOCUMENTS 4,330,204   A   *   5/1982   Dye ..................... G01B 11/272
                                356/139.05
5,030,004   A   *   7/1991   Grant ....................... G02B 6/34
                                398/131

(Continued)

OTHER PUBLICATIONS

Fast Steering Mirrors Data Sheet, https://www.newport.com/mam/celum/celum_assets/np/resources/FSM_Data_Sheet.pdf?2, Jan. 2016, pp. 1-4, Newport Corporation, Irvine, CA, USA.

*Primary Examiner* — Nathan M Cors
(74) *Attorney, Agent, or Firm* — US Naval Research Laboratory; Suresh Koshy

(57) ABSTRACT

A position-tracking apparatus includes a receiver, which includes a beam steerer oriented to receive a laser signal. The laser signal includes a modulated data signal, a carrier signal, and a tracking signal. The receiver includes a segmented photodiode in optical communication with the beam steerer, thereby receiving the laser signal. The segmented photodiode includes a plurality of active-area segments and a photodiode center. Each active-area segment of the plurality of active-area segments includes a peak tracking-signal power and/or a plurality of tracking-signal power minima, if the tracking signal is misaligned with the photodiode center. The apparatus includes a processor communicating with the beam steerer and the segmented photodiode. The processor is configured to determine an offset of the tracking signal from the photodiode center based on the peak tracking-signal power and/or the plurality of tracking-signal power minima and is configured to adjust the beam steerer based on the offset.

18 Claims, 16 Drawing Sheets

(51) Int. Cl.

| | |
|---|---|
| *G01S 7/493* | (2006.01) |
| *G01S 7/497* | (2006.01) |
| *G01S 17/66* | (2006.01) |
| *H04B 10/112* | (2013.01) |

(52) U.S. Cl.
CPC ......... *H04B 10/112* (2013.01); *H04B 10/118* (2013.01)

(56) References Cited

U.S. PATENT DOCUMENTS

| | | | | |
|---|---|---|---|---|
| 5,349,176 | A * | 9/1994 | Czichy | G01S 3/786 |
| | | | | 250/208.2 |
| 6,381,055 | B1 * | 4/2002 | Javitt | H04B 10/1123 |
| | | | | 398/131 |
| 6,493,490 | B1 * | 12/2002 | Steiger | H04B 10/112 |
| | | | | 356/400 |
| 10,277,321 | B1 | 4/2019 | Carlson et al. | |
| 11,329,728 | B1 * | 5/2022 | Adams | H04B 10/532 |
| 2014/0241731 | A1 * | 8/2014 | Peach | H04B 10/11 |
| | | | | 398/139 |
| 2018/0083700 | A1 * | 3/2018 | Graves | H04B 10/1125 |
| 2024/0072893 | A1 * | 2/2024 | Van Wageningen | H04B 10/114 |

* cited by examiner

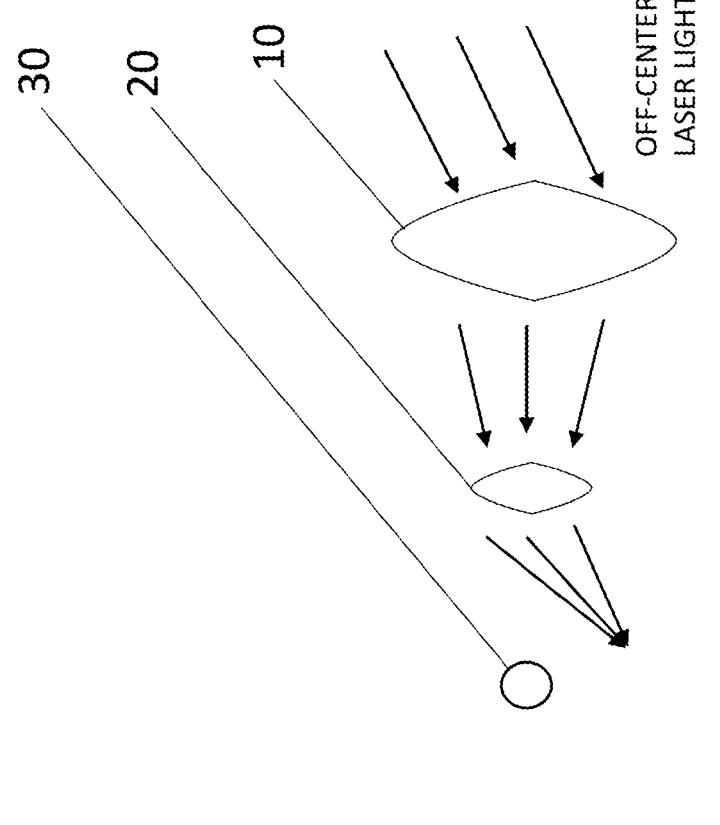
OFF-CENTER
LASER LIGHT
FIG. 1B – PRIOR ART
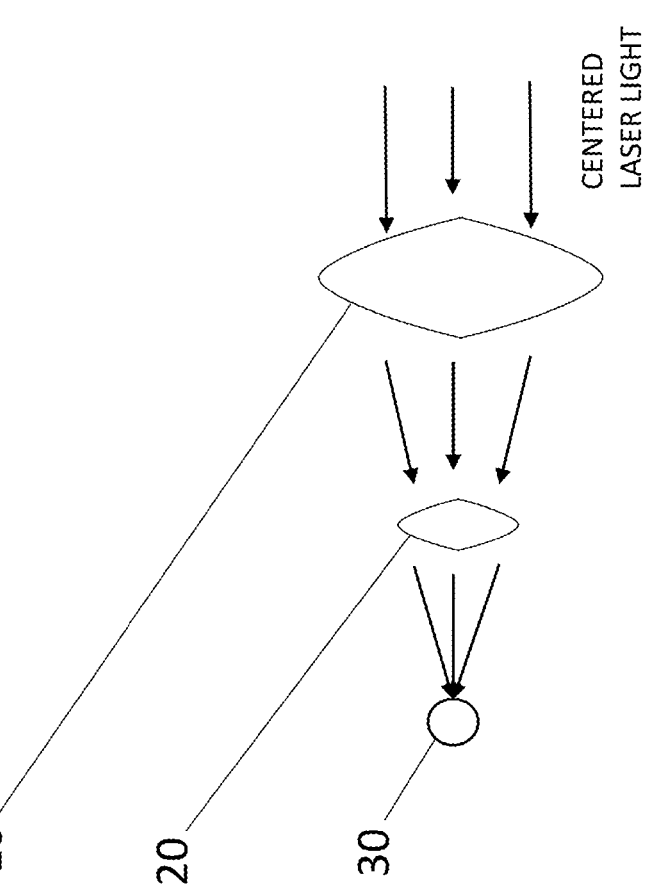
CENTERED
LASER LIGHT
FIG. 1A – PRIOR ART

PROCESSOR

FIELD PROGRAMMABLE GATE ARRAY

140

142

PROCESSOR

PLURLAITY OF CORES

140

144

OPTICAL TRACKING CONTROL SYSTEM

CROSS-REFERENCE TO RELATED APPLICATIONS

This application claims priority to U.S. Provisional Patent Application Ser. No. 63/362,535 entitled "OPTICAL TRACKING CONTROL SYSTEM" to Oelslager et al., which was filed on 6 Apr. 2022 and is incorporated herein by reference.

STATEMENT REGARDING FEDERALLY SPONSORED RESEARCH OR DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210,989-US3.

BACKGROUND OF THE INVENTION

Field of the Invention

This invention relates in general to an apparatus for position tracking, and in particular to an apparatus for position tracking of a laser signal.

Description of the Related Art

For laser-based communications, a gimbal-mounted telescope can be used to track a remote transmitter coarsely, such as shown in FIGS. 1A and 1B. Gathered laser light is focused into a collimated beam using a system of lenses and mirrors, e.g., which are permanently fixed to the back of the telescope. The gathered light is directed to a modem. As shown in FIG. 1A, a telescope includes an objective lens 10 and a focusing lens 20. The telescope optically communicates with a modern such that properly centered laser light passes through the objective lens 10 and the focusing lens 20 and is received by the modem 30. However, vibrations, tracking errors, and/or perturbations in the atmosphere can change the direction of the incoming laser. The changed direction can cause the telescope to direct the gathered light to a location other than that of the modem 30, as shown in FIG. 1B.

Fast steering mirrors ("FSMs") are used for image stabilization in conventional telescope systems. The systems includes a fast steering mirror, a gimbal mount, and multiple photodetector segments. In such conventional telescope systems, controllers provide inputs to the fast steering mirror and the gimbal mount to compensate for pointing errors based on a total amount of non-modulated power received by each photodetector segment. This is not ideal because background light can easily be brighter than laser light, especially at large distances. To compensate, optical coatings and different types of glass or mirrors are used to filter down to a desired frequency band alight; this works fine, if the laser has sufficient power to really stand out from the background. But, higher powered lasers are then required, and performance may degrade during the daytime. Also, the conventional approach of measuring overall signal power on a quadrant does not address issues of spurious or interference signals that may be found in that path.

BRIEF SUMMARY OF THE INVENTION

An embodiment of the invention includes modulated signal tracking, allowing for improved SNR performance and for laser-based communication systems employing such an embodiment to be used in daylight.

An embodiment of the invention includes an improvement to the way optical control systems utilize segmented photodetectors. Applications for optical control systems range widely from image stabilization in cameras or telescopes to laser guided tracking systems for rockets.

In an embodiment of the invention, to improve signal-to-noise ("SNR") performance, laser transmissions are modulated with a tracking tone. The embodiment includes a receiver and a segmented detector, e.g., a quad-cell. At the receiver, an analog front-end is used to isolate signals in the range of the frequency of interest. Each segment on the quad-cell is digitally sampled at a high rate of speed. To compensate for the shifting focus point, the segmented detector provides feedback to a mirror that can 'steer' the focus point back to center. This embodiment of the invention use a modulated laser, providing enhanced sensitivity and enabling 1) improved SNR ratio; 2) background light to be easily ignored (i.e., fostering daylight use); 3) the use of less powerful lasers than heretofore possible for a given communication distance; and 4) an ability to use standard digital modulation techniques, such as CDMA, to enhance performance and security.

An embodiment of the invention includes a position-tracking apparatus. The apparatus includes a receiver. The receiver includes a beam steerer. The beam steerer is oriented to receive a laser signal. The laser signal includes a modulated data signal, a carrier signal and a tracking signal. The receiver also includes a segmented photodiode in optical communication with the beam steerer so as to receive the laser signal. The segmented photodiode includes a plurality of active-area segments and a photodiode center. Each active-area segment of the plurality of active-area segments includes a peak tracking-signal power and/or a plurality of tracking-signal power minima, if the tracking signal is misaligned with the photodiode center. The apparatus also includes a processor communicating with the beam steerer and the segmented photodiode. The processor is configured to determine an offset of the tracking signal from the photodiode center based on the peak tracking-signal power and/or the plurality of tracking-signal power minima. The processor is configured to adjust the beam steerer based on the offset.

BRIEF DESCRIPTION OF THE DRAWINGS

FIG. 1A is a schematic diagram of a prior art telescope receiving centered laser light.

FIG. 1B is a schematic diagram of a prior art telescope receiving off-center laser light.

DETAILED DESCRIPTION OF THE INVENTION

Figure 2:
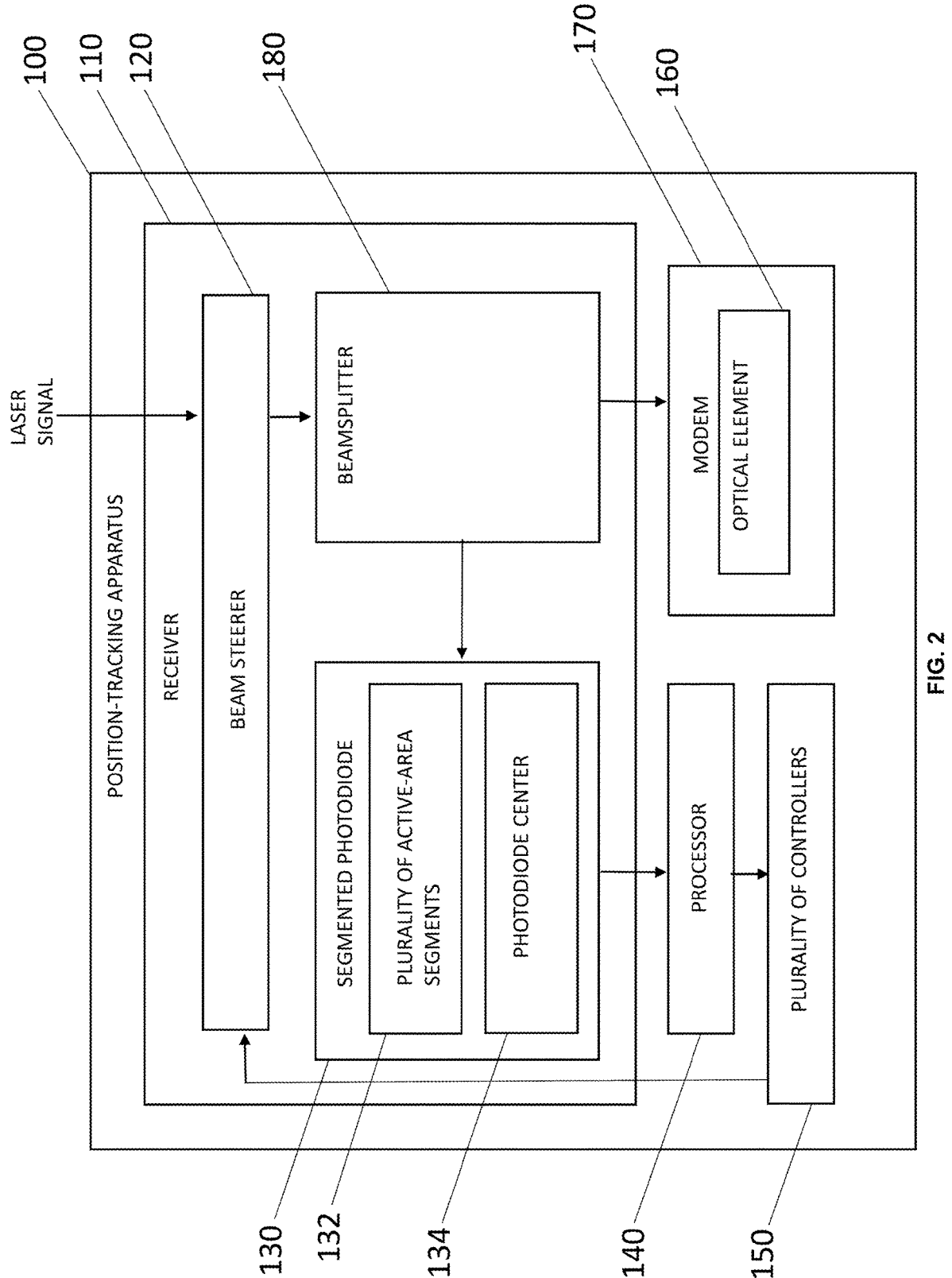
FIG. 2 is a block diagram of a sensor in a position-tracking apparatus according to an embodiment of the invention.

An embodiment of the invention includes a position-tracking apparatus 100 and is described as follows by way of illustrative reference to FIG. 2. The apparatus 100 includes a receiver 110. The receiver 110 includes a standard beam steerer 120. The beam steerer 120 is oriented to receive a laser signal. The laser signal includes a modulated data signal, a carrier signal, and a tracking signal. The receiver 110 also includes a standard segmented photodiode 130 in optical communication with the beam steerer 120 so as to receive the laser signal. The segmented photodiode 130 includes a plurality of active-area segments 132 and a photodiode center 134. Each active-area segment of the plurality of active-area segments 132 includes a peak tracking-signal power and/or a plurality of tracking-signal power minima, if the tracking signal is misaligned with the photodiode center 134. The apparatus 100 also includes a standard processor 140 communicating with the beam steerer 120 and the segmented photodiode 130. The processor 140 is configured to determine an offset of the tracking signal from the photodiode center 134 based on the peak tracking-signal power and/or the plurality of tracking-signal power minima. The processor 140 is configured to adjust the beam steerer 120 based on the offset.

An embodiment of the invention includes a noise floor, wherein if no tracking signal exists in a given active-area segment of the plurality of active-area segment, that active-area segment produces a value (or if no laser is being downlinked, all of the active area segments produce values) that are small relative the peak tracking-signal power. If a valid tracking signal that is downlinked, and such a small value on an active segment is detected, then that small value registers as "no-power" on that active segment. The noise floor is further illustrated as follows by way of non-limiting example. Absent the invention, the noise floor of a position tracking system is the ultimate SNR limit. For example, before a downlink including the laser light turns on, an embodiment of the invention has a system noise floor of ~−47 dBm. The processor of the embodiment of the invention includes signal processing, as described below. The signal processing correlates to a known embedded low rate continuous wave tone, effectively pulling the data signal out from well below the system noise floor. In this example, portions of a modulated data signal were detected 8 to 9 dB below the noise floor for processing, which reflects a signal-to-noise improvement of 8 to 9 dB. Using a typical power ratio equation of Ratio_dB=10*log(Pout/Pin), for example, 9 dB of SNR improvement reduces the transmitted laser power needed to satisfy the link by approximately 7.9 times. This translates to design benefits in ground stations and/or satellites from power, cooling, size, and cost perspectives.

Optionally, the processor 140 is configured to steer the beam steerer 120 using the offset so that the signal of interest is re-centered on the photodiode center 134.

Optionally, the processor 140 includes signal processing. The signal processing is configured to isolate the tracking signal from the laser signal. Optionally, the signal processing includes a standard Fast Fourier Transform in engine, a standard discrete-time Fourier Transform engine, a standard CORDIC engine, a standard low-pass filter, a standard finite impulse response matched filter, a standard infinite impulse response matched filter, a standard time synchronizer, a standard frequency synchronizer, a standard symbol synchronizer, a standard frame synchronizer, a standard pulse detector, a standard carrier recovery correlator, a standard code recovery correlator, and/or a standard pseudo-random noise correlator. CORDIC is an acronym for "coordinate rotation digital computer;" it is alternatively known as Volder's algorithm. A CORDIC engine is, for example, used when no hardware multiplier is available (e.g. in simple microcontrollers and FPGAs) because the CORDIC engine only requires operations of additions, subtractions, and bitshifts, as well as lookup tables. Optionally, the pseudo-random noise correlator is configured to match the tracking signal.

Optionally, the tracking signal includes a standard continuous wave signal, a standard frequency-modulated signal, or a standard phase-modulated signal. Optionally, the frequency-modulated signal includes a standard frequency-shift keying signal. For example, in an embodiment of the invention, the frequency-shift keying signal includes at least one standard coherent frequency-shift keying signal. In another embodiment of the invention, the frequency-shift keying signal includes at least one standard noncoherent frequency-shift keying signal. Optionally, the phase-modulated signal comprises a standard phase-shift keying signal. For example, in an embodiment of the invention, the phase-modulated signal includes at least one standard binary phase-shift keying signal. In another embodiment of the invention, the phase-modulated signal includes at least one standard quadrature phase-shift keying signal.

Optionally, the processor 140 is configured to calculate the offset at least by comparing a respective plurality of tracking-signal power values in the plurality of active-area segments 130 and by determining which segment in the plurality of active-area segments includes the peak tracking-signal power.

Optionally, the apparatus 100 further includes a standard plurality of controllers 150 in communication with the beam steerer 120 and the processor 140. The processor 140 is configured to transmit the offset, one of directly and indirectly, to the plurality of controllers 150. The plurality of controllers 150 is configured to adjust the beam steerer 120 based on the offset.

Optionally, the offset includes a plurality of coordinate values. For example, in an embodiment of the invention, the plurality of coordinate values is in a Cartesian coordinate system. In another embodiment of the invention, the plurality of coordinate values is in a polar coordinate system. In another embodiment of the invention, the plurality of coordinate values is in cylindrical coordinate system. In another embodiment of the invention, the plurality of coordinate values is in spherical coordinate system. The plurality of controllers includes a plurality of coordinate controllers respectively corresponding to the plurality of coordinate values. The plurality of coordinate controllers is in communication with the beam steerer 120 and the processor 140. The processor 140 is configured to transmit respectively the plurality of coordinate values to the plurality of coordinate controllers. The plurality of coordinate controllers 150 is configured to steer the beam steerer 120 based on the plurality of coordinate values.

Figure 3:
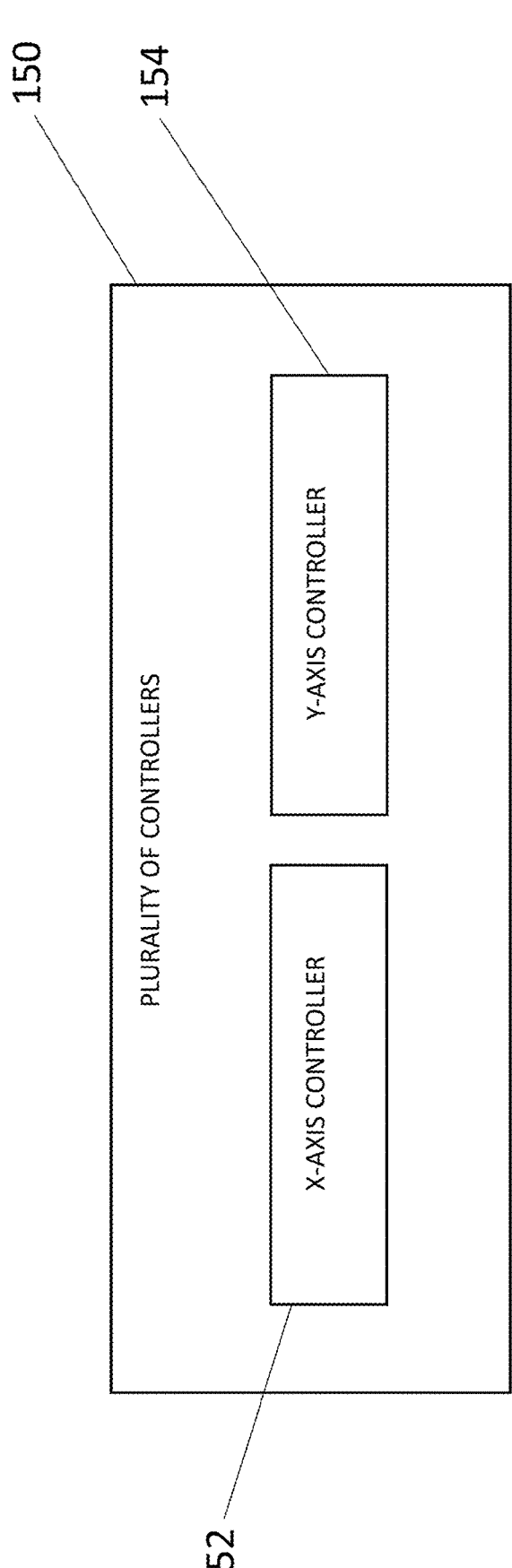
FIG. 3 is a block diagram of a plurality of controllers according to an embodiment of the invention.
Figures 4A, 4B:
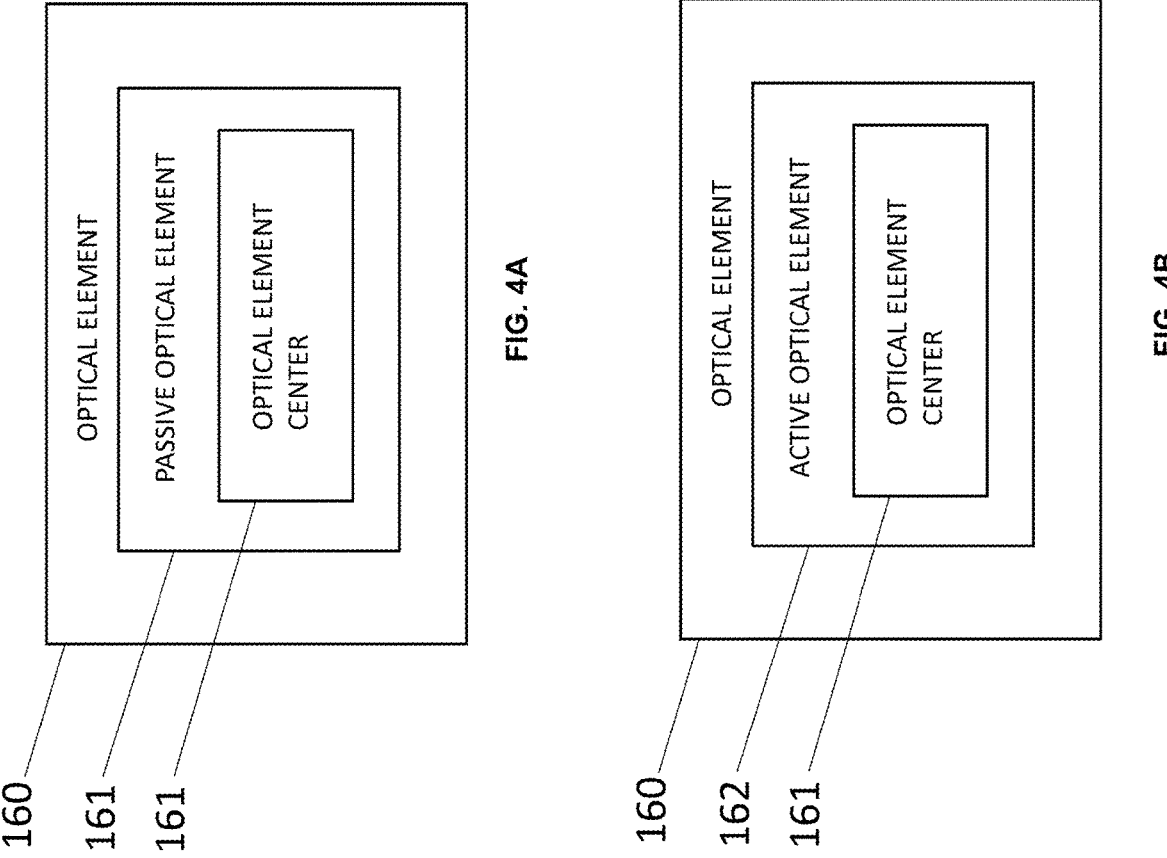
FIG. 4A is a block diagram of an optical element according to an embodiment of the invention.
FIG. 4B is a block diagram of another optical element according to an embodiment of the invention.
Figures 5A, 5B:
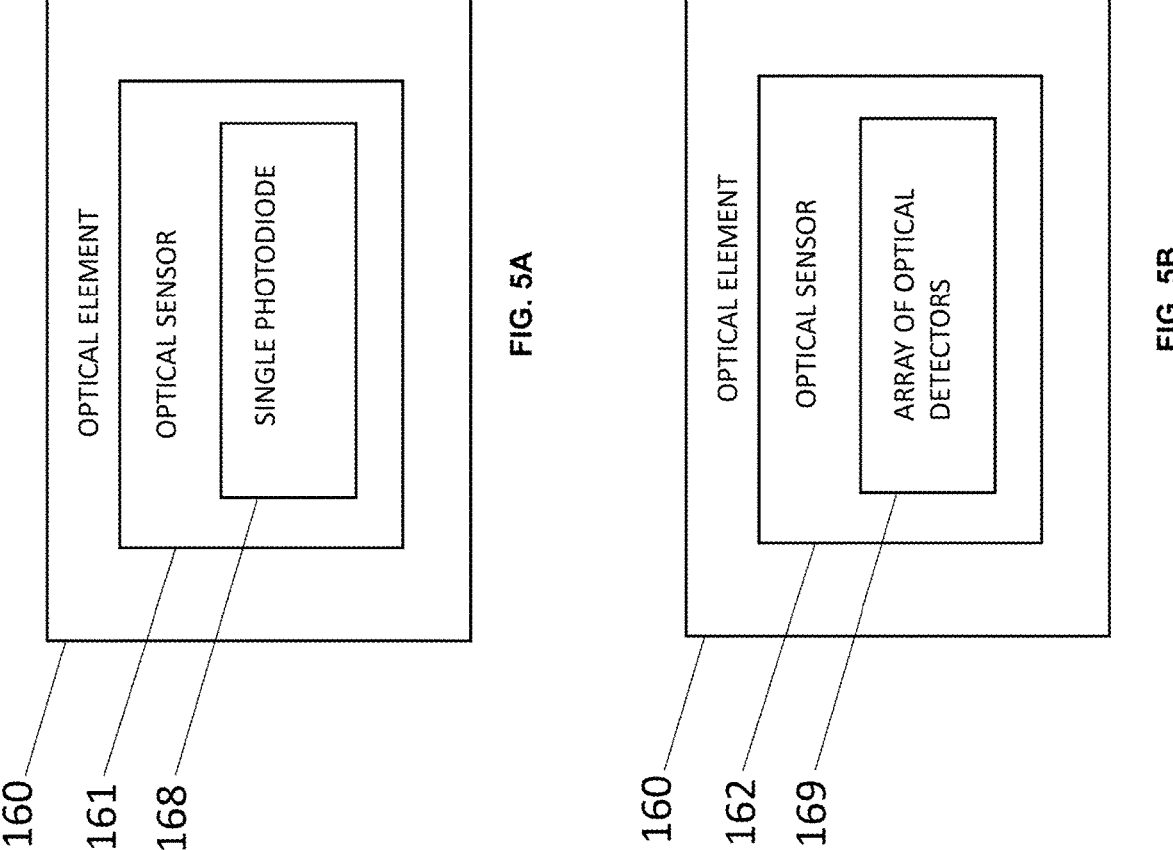
FIG. 5A is a block diagram of an optical element including an optical sensor according to an embodiment of the invention.
FIG. 5B is a block diagram of another optical element including another optical sensor according to an embodiment of the invention.
Figures 5C, 5D:
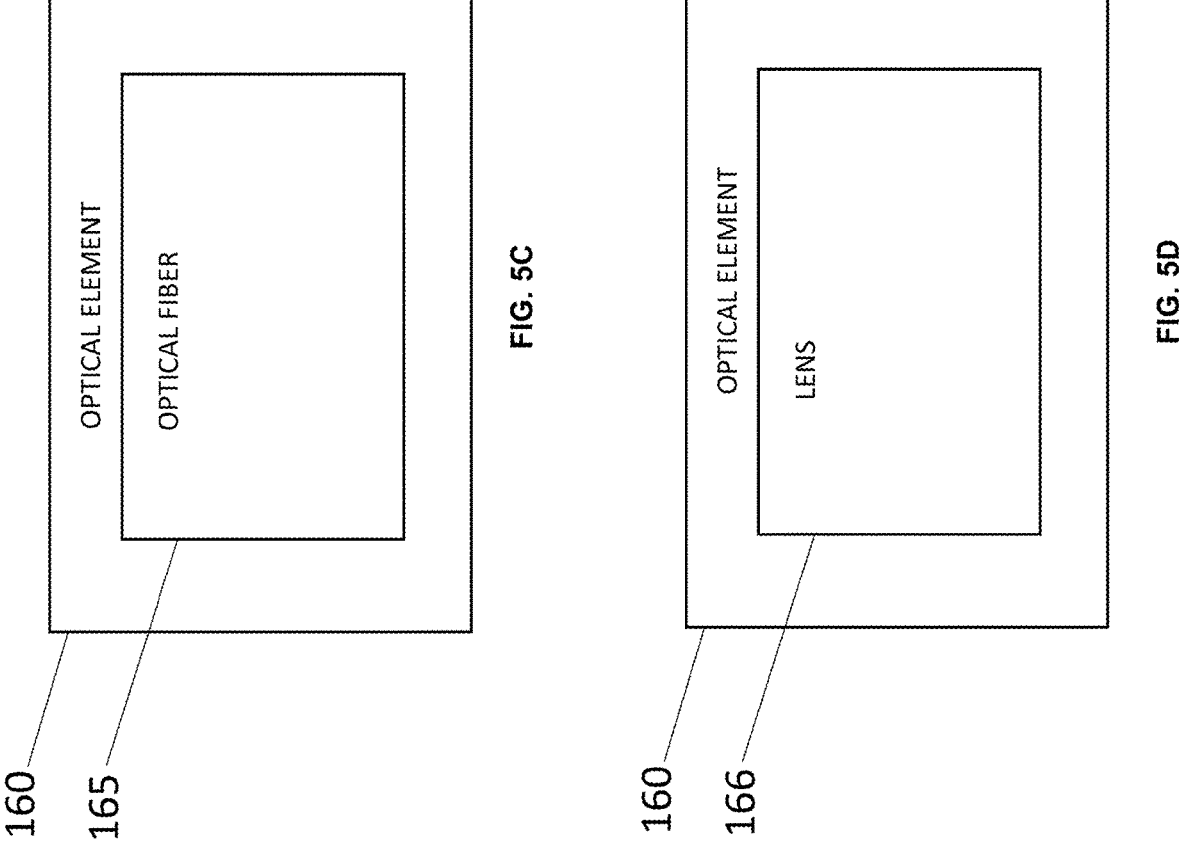
FIG. 5C is a block diagram of an optical element including an optical fiber according to an embodiment of the invention.
FIG. 5D is a block diagram of another optical element including a lens according to an embodiment of the invention.
Figure 5E:
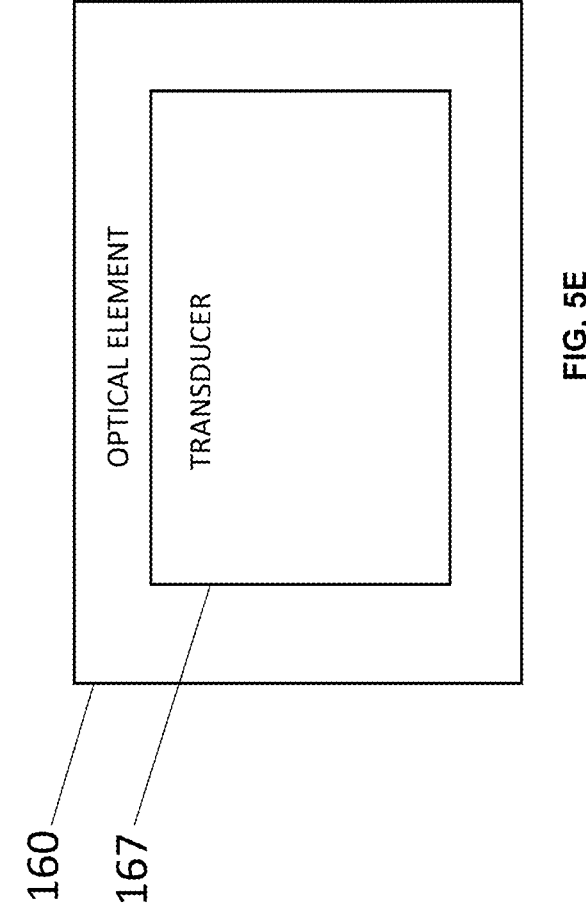
FIG. 5E is a block diagram of another optical element including a transducer according to an embodiment of the invention.
Figures 6A, 6B:
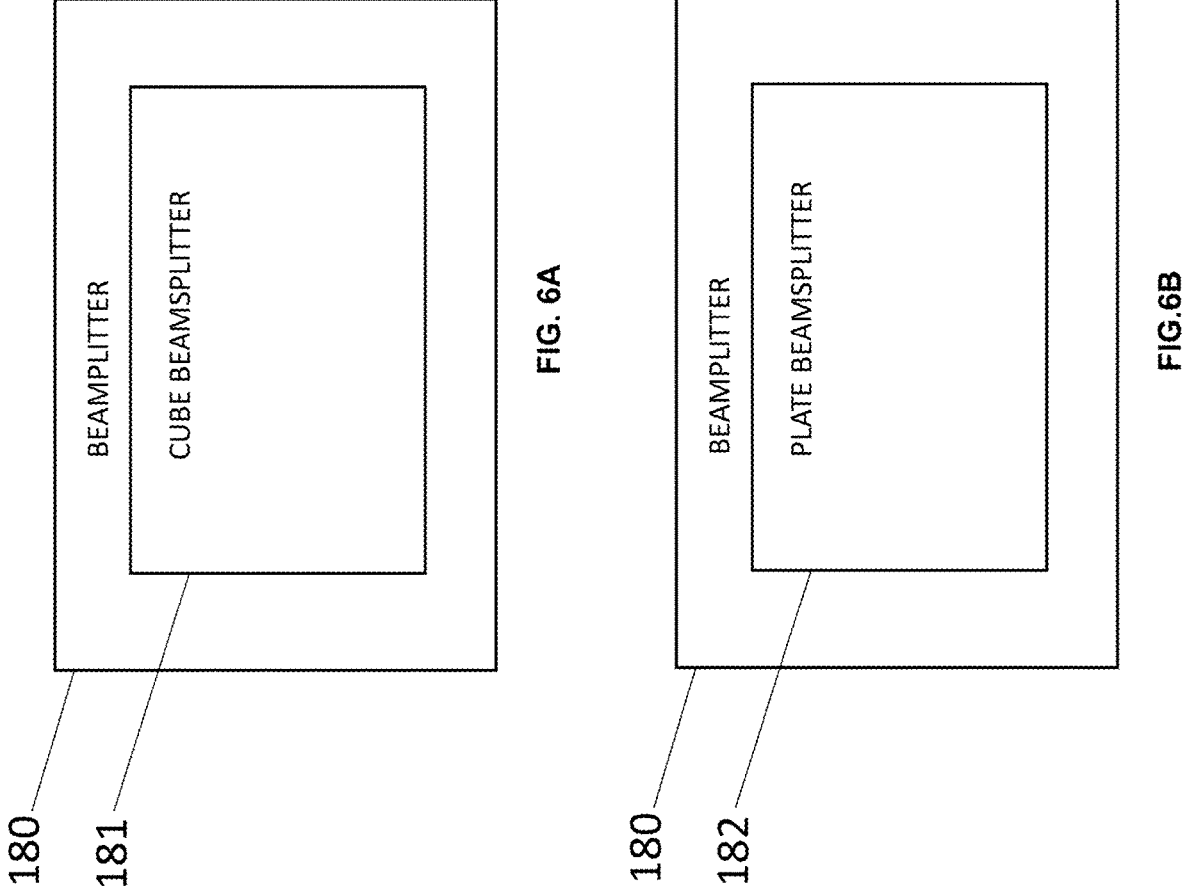
FIG. 6A is a block diagram of a beamsplitter including a cube beamsplitter according to an embodiment of the invention.
FIG. 6B is a block diagram of a beamsplitter including a plate beamsplitter according to an embodiment of the invention.
Figures 6C, 6D:
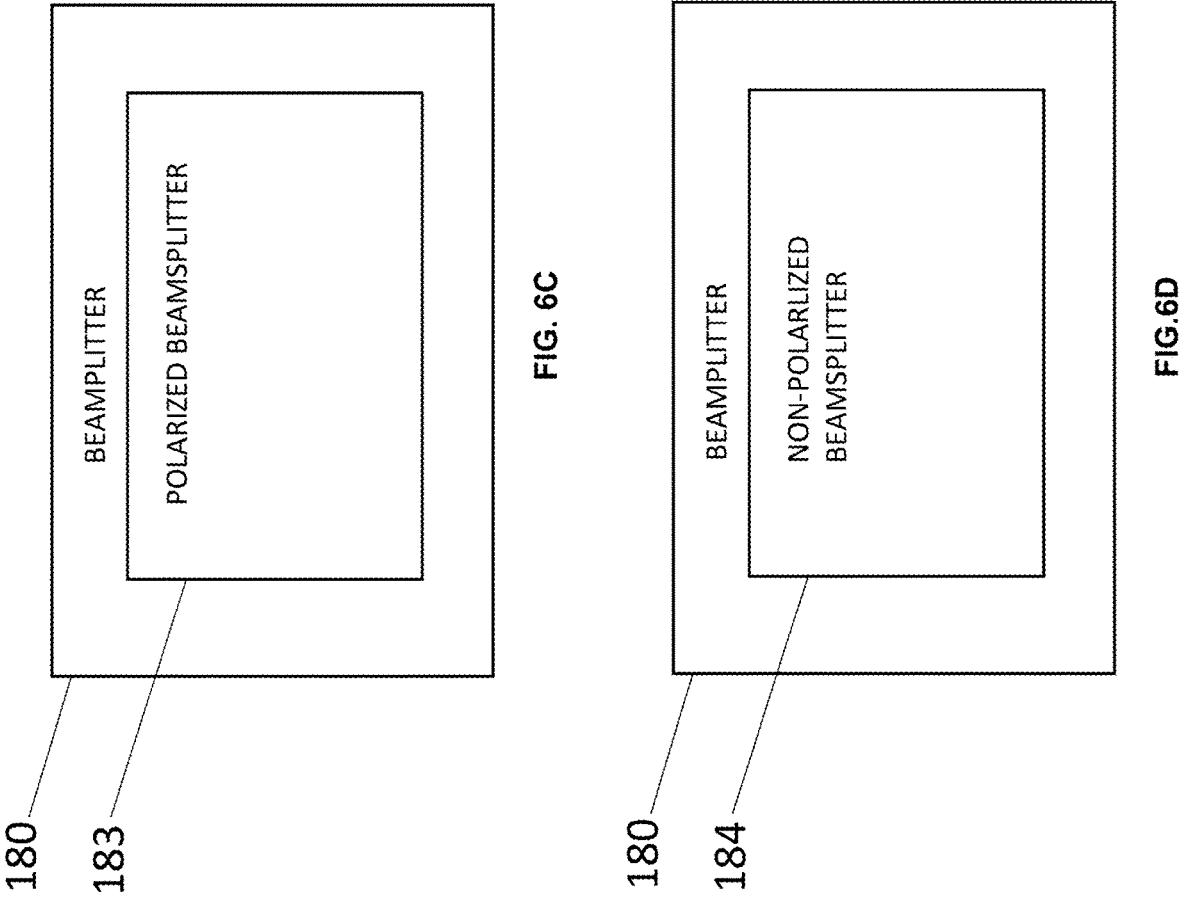
FIG. 6C is a block diagram of a beamsplitter including a polarized beamsplitter according to an embodiment of the invention.
FIG. 6D is a block diagram of a beamsplitter including a non-polarized beamsplitter according to an embodiment of the invention.
Figures 6E, 6F:
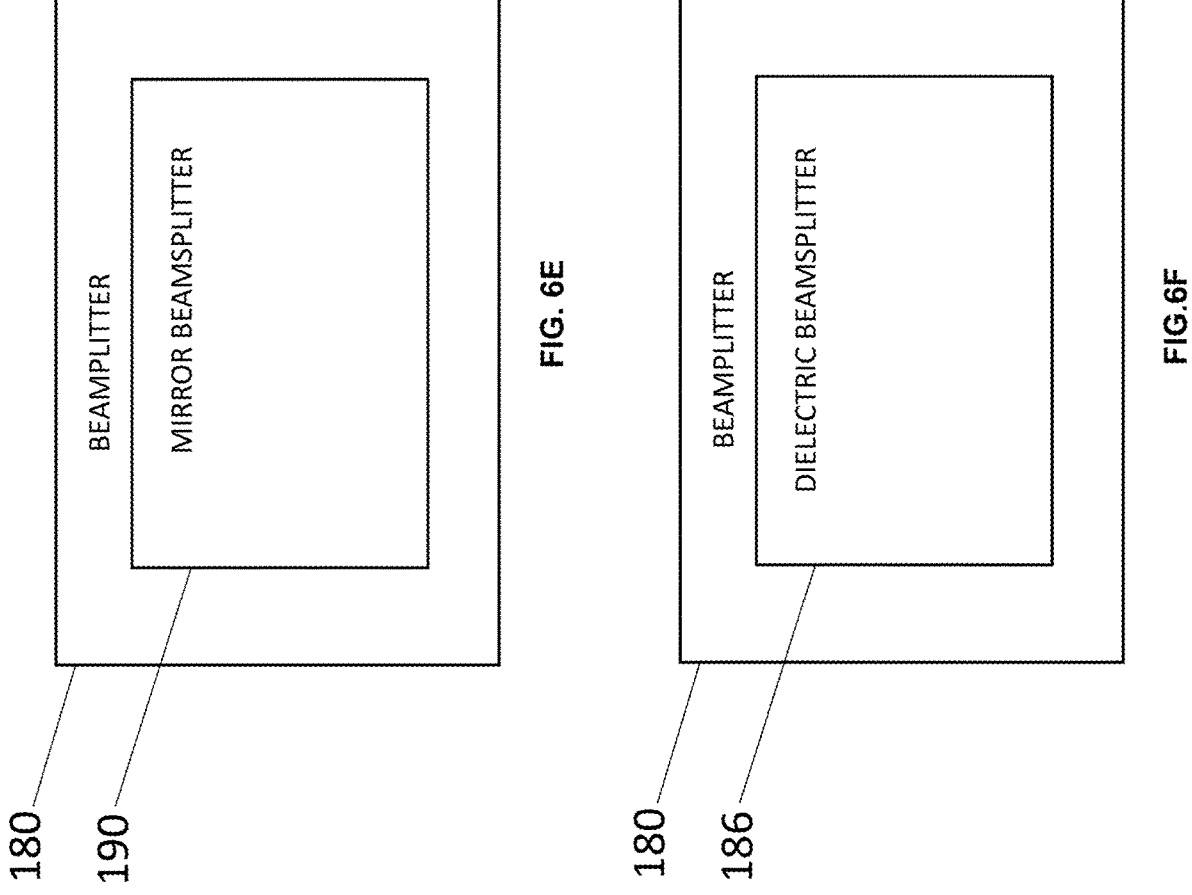
FIG. 6E is a block diagram of a beamsplitter including a mirror beamsplitter according to an embodiment of the invention.
FIG. 6F is a block diagram of a beamsplitter including a dielectric beamsplitter according to an embodiment of the invention.
Figures 7A, 7B, 7C:
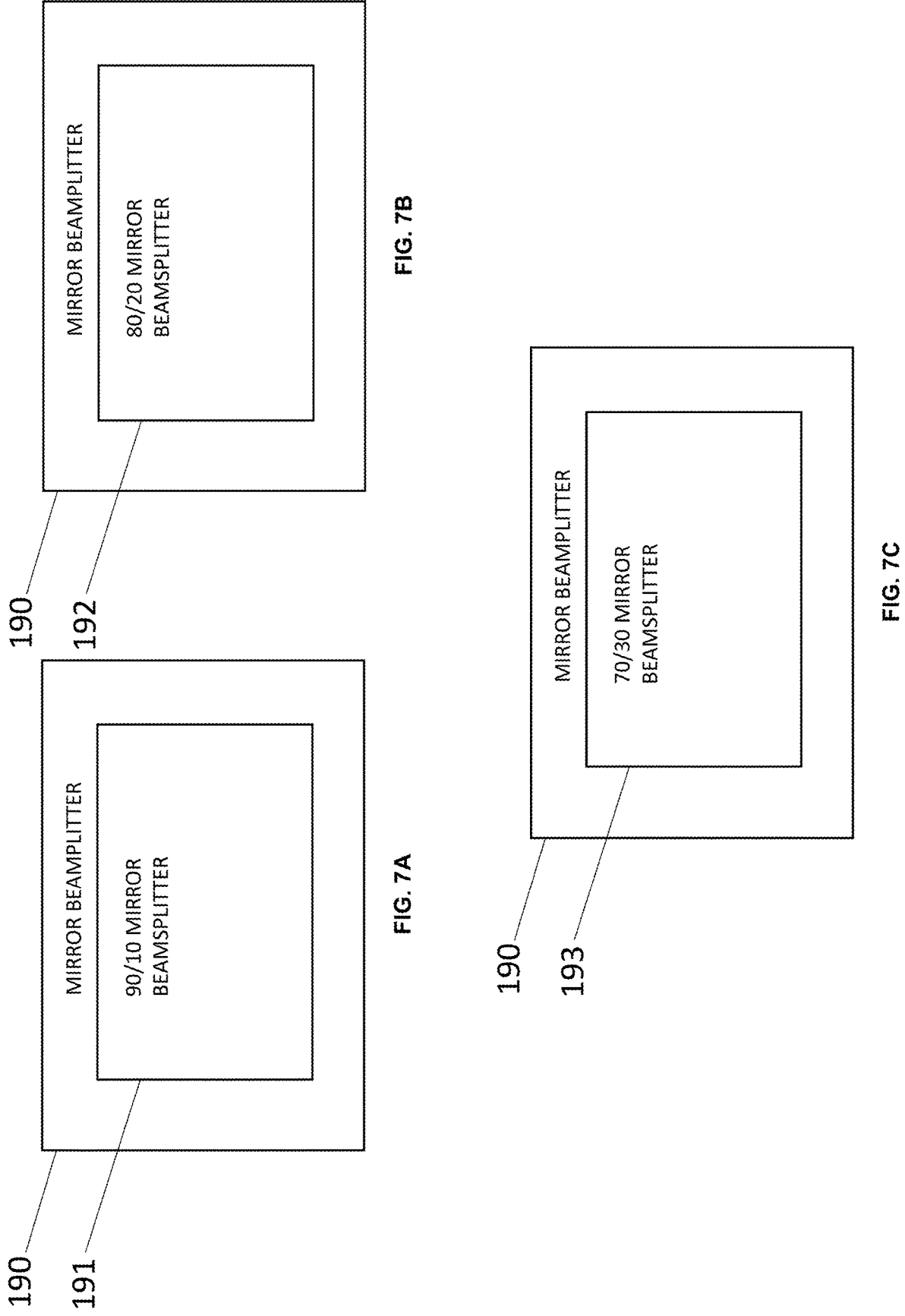
FIG. 7A is a block diagram of a mirror beamsplitter including a 90/10 mirror beamsplitter according to an embodiment of the invention.
FIG. 7B is a block diagram of a mirror beamsplitter including an 80/20 mirror beamsplitter according to an embodiment of the invention.
FIG. 7C is a block diagram of a mirror beamsplitter including a 70/30 mirror beamsplitter according to an embodiment of the invention.
Figures 7D, 7E:
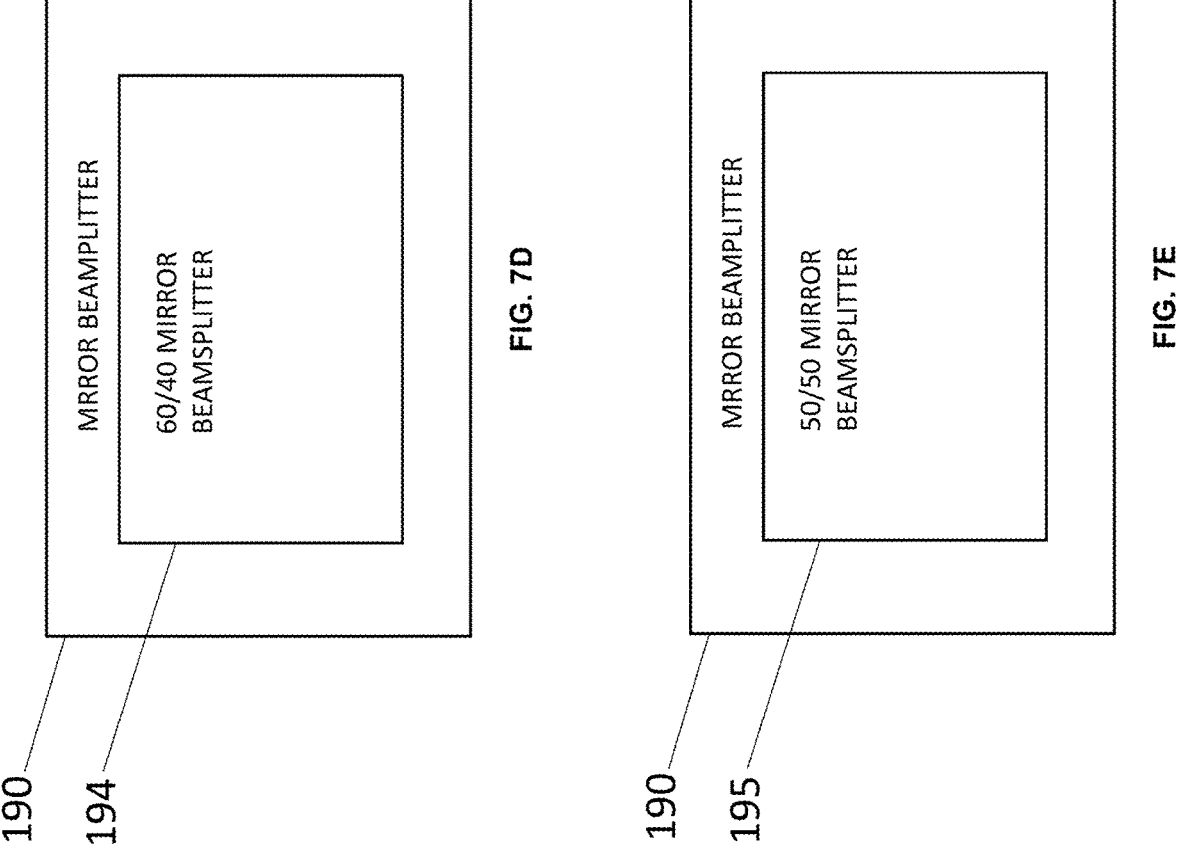
FIG. 7D is a block diagram of a mirror beamsplitter including a 60/40 mirror beamsplitter according to an embodiment of the invention.
FIG. 7E is a block diagram of a mirror beamsplitter including a 50/50 mirror beamsplitter according to an embodiment of the invention.
Figures 8A, 8B:
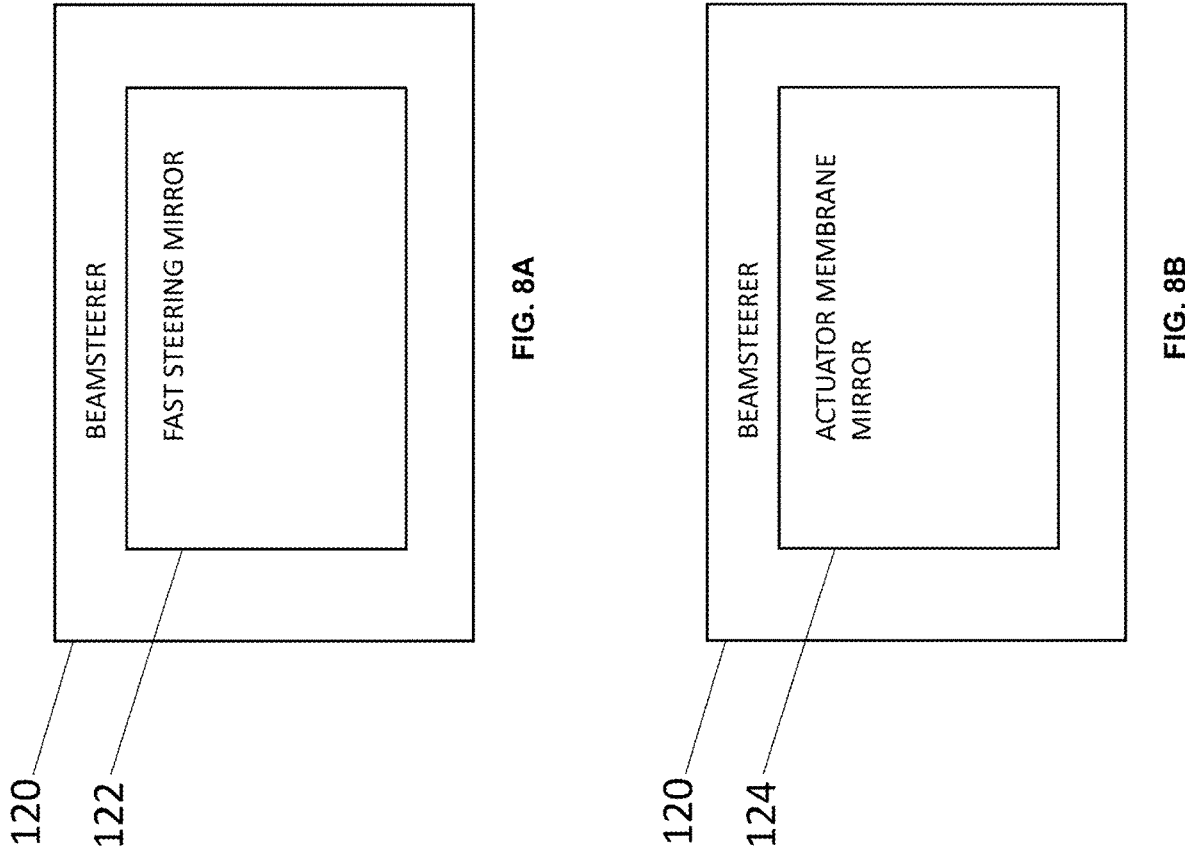
FIG. 8A is a block diagram of a beam steerer including a fast steering mirror according to an embodiment of the invention.
FIG. 8B is a block diagram of a beam steerer including an actuator membrane mirror according to an embodiment of the invention.
Figures 8C, 8D:
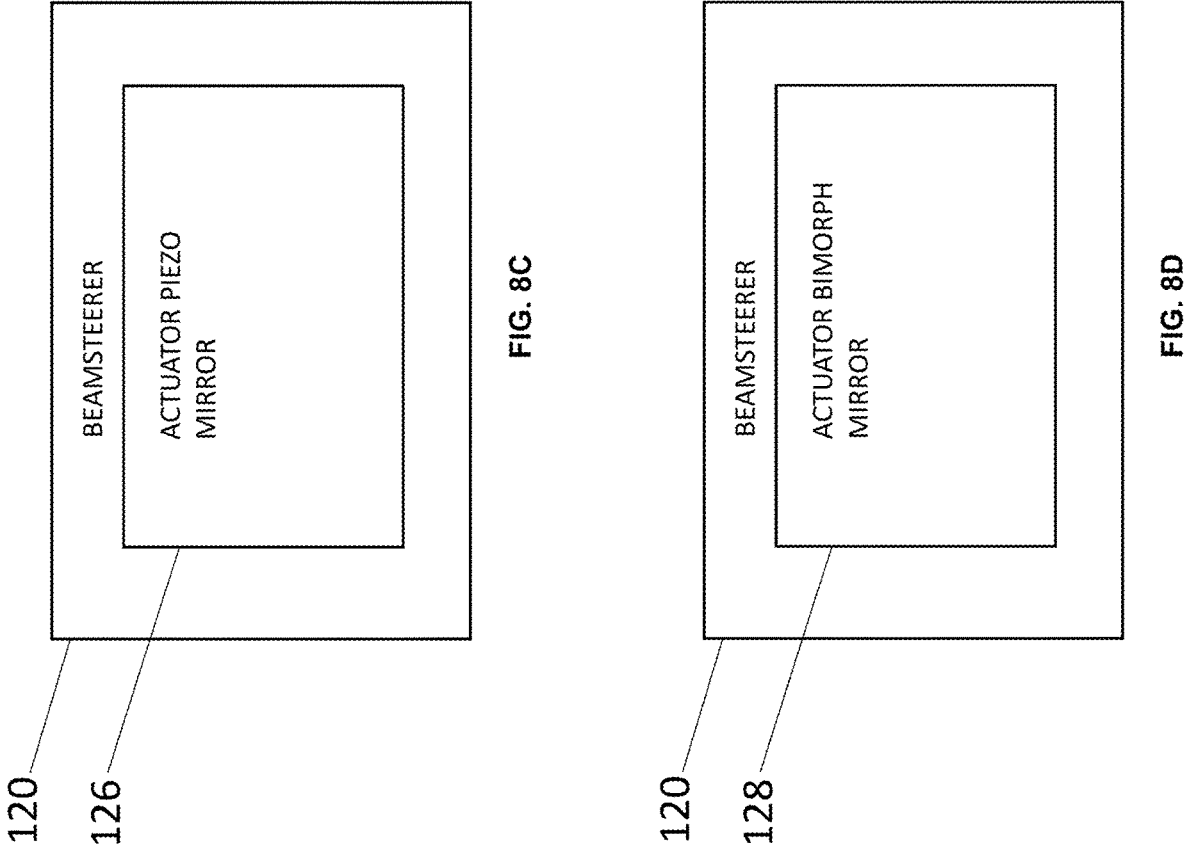
FIG. 8C is a block diagram of a beam steerer including an actuator piezo mirror according to an embodiment of the invention.
FIG. 8D is a block diagram of a beam steerer including an actuator bimorph mirror according to an embodiment of the invention.

Optionally, the plurality of coordinate values includes an X-coordinate value and a Y-coordinate value. The plurality of coordinate controllers includes an X-axis proportional-integral-derivative controller 152 and a Y-axis proportional-integral-derivative controller 154, as shown by way of illustration in FIG. 3. The processor 140 is configured to transmit to the X-coordinate value to the X-axis proportional-integral-derivative controller 152. The X-axis proportional-integral-derivative controller 152 is configured to steer the beam steerer 120 based on the X-coordinate value. The processor 140 is configured to transmit to the Y-coordinate value to the Y-axis proportional-integral-derivative controller 154. The Y-axis proportional-integral-derivative controller 154 is configured to steer the beam steerer 120 based on the Y-coordinate value.

Optionally, the receiver 110 further includes a standard optical element 160 in optical communication with the beam steerer 120, as shown by way of illustration in FIGS. 4A-4B and 5A-5E. For example, in an embodiment of the invention, the optical element 160 includes a standard passive optical element 161. In another embodiment of the invention, the optical element includes a standard active optical element 162. The optical element 160 includes an optical element center 163 corresponding to the photodiode center 134. Optionally, the optical element 160 comprises a standard optical sensor 164, a standard optical fiber 165, a standard lens 166, or a standard transducer 167. For example, in an embodiment of the invention, the optical sensor 164 includes a standard single photodiode 168. In another embodiment of the invention, the optical sensor 164 includes a standard array of optical detectors 169, e.g., a standard array of photodiodes. Optionally, the apparatus 100 further includes a standard modem 170 comprising or communicating with the optical element 160. Optionally, the apparatus 100 further includes a standard beamsplitter 180 in optical communication with the beam steerer 120, the segmented photodiode 130, and the modem 170. For example, in an embodiment of the invention, the beamsplitter 180 includes a standard cube beamsplitter 181, a standard plate beamsplitter 182, a standard polarized beamsplitter 183, a standard non-polarized beamsplitter 184, a standard mirror beamsplitter 190, and/or a standard dielectric beamsplitter 186, as shown by way of illustration in FIGS. 6A-6F. In an embodiment of the invention, the mirror beamsplitter 190 includes a standard 90/10 mirror 191, a standard 80/20 mirror 192, a standard 70/30 mirror 193, standard 60/40 mirror 194, and/or a standard 50/50 mirror 195, as shown by way of illustration in FIGS. 7A-7E. The beamsplitter 180 is configured to reflect or transmit the laser signal from the beam steerer 120 to the segmented photodiode 130 and to the modem 170.

Optionally, the beam steerer 120 includes a standard fast steering mirror 122, a standard actuator membrane mirror 124, a standard actuator piezo mirror 126, and/or a standard actuator bimorph mirror 128, as shown by way of illustration in FIGS. 8A-8D. For the purpose of this patent application, "fast steering mirror" is a term of art, and is defined as a mirror integrated on a steering platform (e.g., tilt or tip/tilt) with positions sensors and a controller.

Optionally, the laser signal includes a satellite downlink, an aircraft downlink, a watercraft downlink, or a terrestrial downlink.

Figures 9A, 9B:
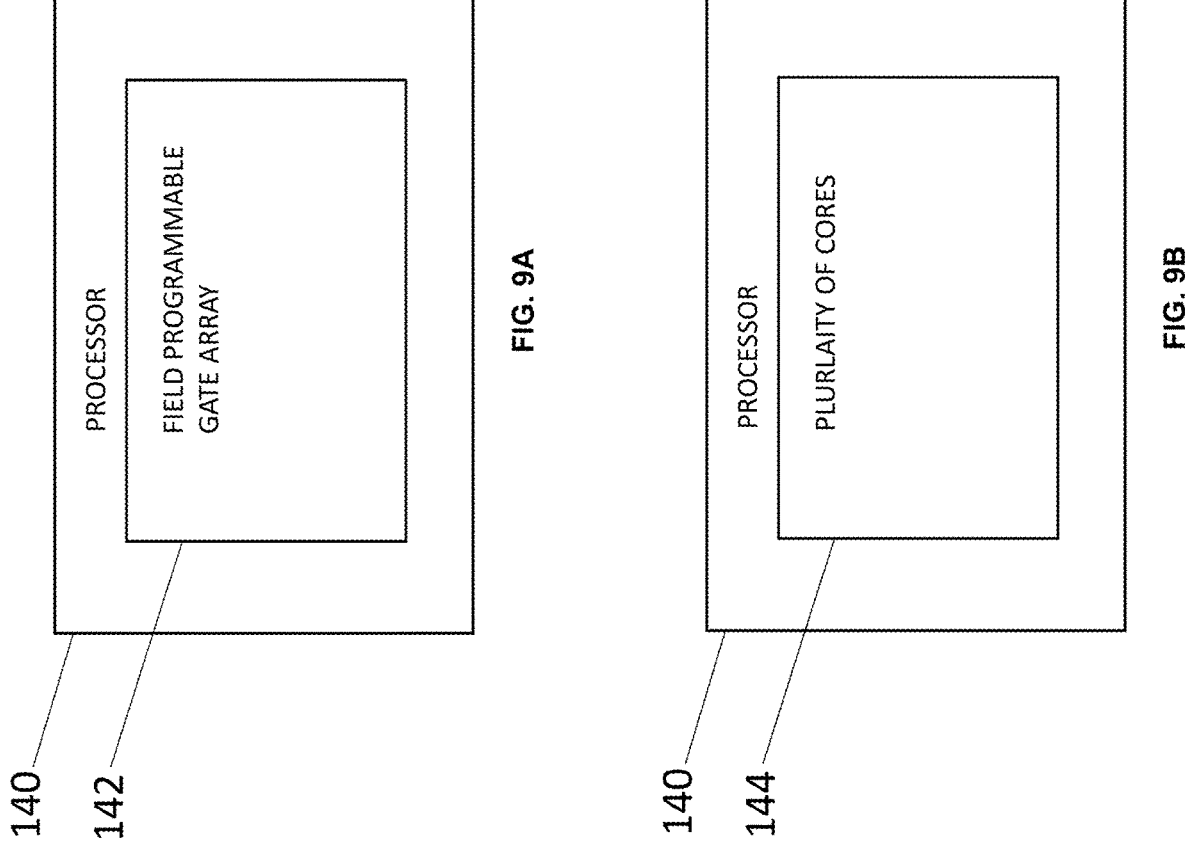
FIG. 9A is a block diagram of a processor including a field gate programmable array according to an embodiment of the invention.
FIG. 9B is a block diagram of a processor including a plurality of cores according to an embodiment of the invention.
Figure 9C:
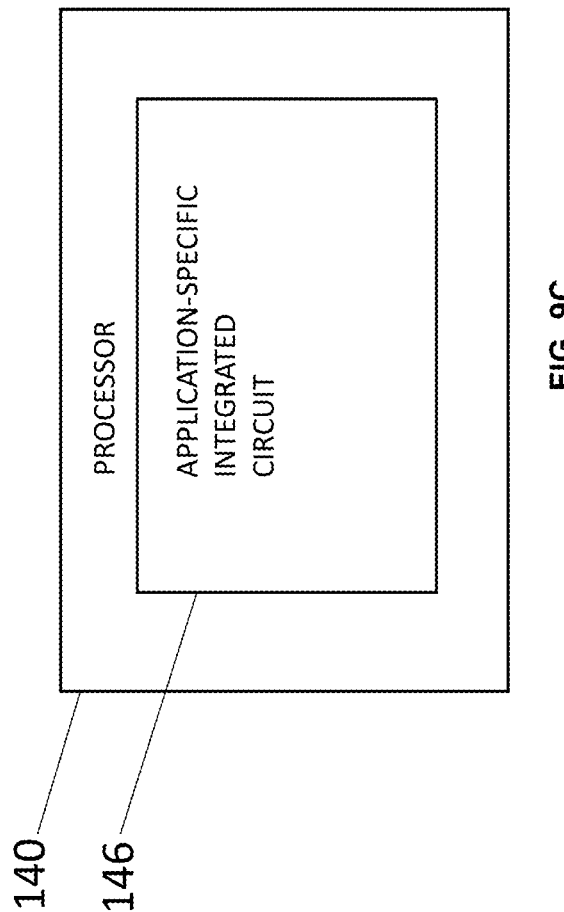
FIG. 9C is a block diagram of a processor including an application-specific integrated circuit according to an embodiment of the invention.

Optionally, the processor 140 is configured to process a plurality of digital signal paths simultaneously. Optionally, the processor 140 includes a standard field programmable gate array 142, a standard plurality of cores 144, or a standard application specific integrated circuit 146, as shown by way of illustration in FIGS. 9A-9C.

Another embodiment of the invention provides adaptive mirror steering, wherein the collimated light, e.g., laser light, is split into two paths: one that terminates at a standard quad-cell, and the other at a standard modem. The system is tuned so that the center of the quad-cell is aligned with the modem's photodetector. A fast steering mirror provides finer control than a conventional telescope gimbal is capable of providing. This embodiment of the invention operates, for example, as follows. An optical downlink is detected by an eight-segmented photodiode, and optical energy is converted into electrical current on four individual electrical paths. In this example, a standard eight-segmented photodiode can be treated as a quad-cell. Each path then hits a trans-impedance section that converts that electrical current into electrical voltage. Each path is then sent through a variety of circuits to include filtering, differential signaling, and pre-amplification. Each path is then simultaneously digitized by analog to digital convertors for ingest into a field gate programmable array ("FPGA"). Once onboard the FPGA, each digitized path is adaptively finite impulse response ("FIR") filtered to optimize signal and noise levels. Each path then moves through an FFT and CORDIC engine, producing results for the correlation process. The output of the correlation process on each path is a power ratio and frequency bin of which peak results are found. These ratios and bins are then algebraically analyzed based on sum totals found at that given instance in time. These results drive X-axis and Y-axis proportional-integral-derivative ("PID") controllers to determine the optimal position to position dampening in order to drive X and Y digital-to-analog convertors ("DACs"). The X and Y DACs produce corrective voltages which are sent to a fast steering mirror, so that the mirror can continually (e.g., 8000 times per second) steer its reflective surface to the best possible offset within the system's optical path to keep the downlink laser bouncing directly down the center of the system's main optical fiber so no data is lost.

An embodiment of the invention comprises a computer program instructions, which computer program instructions embody the steps, functions, filters, and/or subsystems described herein. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±50% of that stated.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   a receiver comprising:
   a beam steerer, said beam steerer being oriented to receive a laser signal, the laser signal comprising a modulated data signal, a carrier signal, and a tracking signal, and
   a segmented photodiode in optical communication with said beam steerer so as to receive said laser signal, said segmented photodiode comprising a plurality of active-area segments and a photodiode center, each active-area segment of said plurality of active-area segments comprising at least one of a peak tracking-signal power and a plurality of tracking-signal power minimum minima, if the tracking signal is misaligned with the photodiode center; and a processor communicating with said beam steerer and said segmented photodiode, said processor being configured to determine an offset of the tracking signal from the photodiode center based on the at least one of the peak tracking-signal power and the tracking-signal power minimum, said processor being configured to adjust said beam steerer based on the offset, wherein said processor is configured to calculate the offset at least by comparing a respective plurality of tracking-signal power values in said plurality of active-area segments and by determining which segment in said plurality of active-area segments comprises said peak tracking-signal power.

2. The apparatus according to claim 1, wherein said processor is configured to steer said beam steerer using said offset so that said signal of interest is re-centered on the photodiode center.

3. The apparatus according to claim 1, wherein said processor comprises signal processing, said signal processing being configured to isolate the tracking signal from the laser signal.

4. The apparatus according to claim 3, wherein said signal processing comprises at least one of a Fast Fourier Transform engine, a discrete-time Fourier Transform engine, a CORDIC engine, a low-pass filter, a finite impulse response matched filter, an infinite impulse response matched filter, a time synchronizer, a frequency synchronizer, a symbol synchronizer, a frame synchronizer, a pulse detector, a carrier recovery correlator, a code recovery correlator, and a pseudo-random number sequence correlator.

5. The apparatus according to claim 1, wherein the tracking signal comprises one of a continuous wave signal, a frequency-modulated signal, and a phase-modulated signal.

6. The apparatus according to claim 5, wherein one of:
the frequency-modulated signal comprises a frequency-shift keying signal, and
the phase-modulated signal comprises a phase-shift keying signal.

7. The apparatus according to claim 4, wherein said pseudo-random number sequence correlator is configured to match the tracking signal.

8. The apparatus according to claim 1, further comprising:
a plurality of controllers in communication with said beam steerer and said processor,
wherein said processor is configured to transmit the offset, one of directly and indirectly, to said plurality of controllers,
wherein said plurality of controllers is configured to adjust said beam steerer based on the offset.

9. The apparatus according to claim 8, wherein the offset comprises a plurality of coordinate values,
wherein said plurality of controllers comprises a plurality of coordinate controllers respectively corresponding to the plurality of coordinate values, said plurality of coordinate controllers being in communication with said beam steerer and said processor,
wherein said processor is configured to transmit respectively the plurality of coordinate values to said plurality of coordinate controllers, said plurality of coordinate controllers being configured to steer said beam steerer based on the plurality of coordinate values.

10. The apparatus according to claim 9, wherein said plurality of coordinate values comprise an X-coordinate value and a Y-coordinate value,
wherein said plurality of coordinate controllers comprises an X-axis proportional-integral-derivative controller and a Y-axis proportional-integral-derivative controller,
wherein said processor is configured to transmit to the X-coordinate value to said X-axis proportional-integral-derivative controller, said X-axis proportional-integral-derivative controller being configured to steer said beam steerer based on the X-coordinate value,
wherein said processor is configured to transmit to the Y-coordinate value to said Y-axis proportional-integral-derivative controller, said Y-axis proportional-integral-derivative controller being configured to steer said beam steerer based on the Y-coordinate value.

11. The apparatus according to claim 1, wherein said receiver further comprises:
an optical element in optical communication with said beam steerer, said optical element comprising an optical element center corresponding to said photodiode center.

12. The apparatus according to claim 11, wherein said optical element comprises one of an optical sensor, an optical fiber, a lens, and a transducer.

13. The apparatus according to claim 11, further comprising:
a modem comprising said optical element.

14. The apparatus according to claim 13, further comprising:
a beamsplitter in optical communication with said beam steerer, said segmented photodiode, and said modem, said beamsplitter being configured to one of reflect and transmit said laser signal from said beam steerer to said segmented photodiode and to said modem.

15. The apparatus according to claim 1, wherein said beam steerer comprises at least one of a fast steering mirror, an actuator membrane mirror, an actuator piezo mirror, and an actuator bimorph mirror.

16. The apparatus according to claim 1, wherein said laser signal comprises one of a satellite downlink, an aircraft downlink, a watercraft downlink, and a terrestrial downlink.

17. The apparatus according to claim 1, wherein said processor is configured to process a plurality of digital signal paths simultaneously.

18. The apparatus according to claim 17, wherein said processor comprises one of:
a field programmable gate array;
a plurality of cores; and
an application specific integrated circuit.

* * * * *